(12) United States Patent
Chang et al.

(10) Patent No.: US 8,994,906 B2
(45) Date of Patent: Mar. 31, 2015

(54) DISPLAY WITH MULTILAYER AND EMBEDDED SIGNAL LINES

(75) Inventors: Shih-Chang Chang, Cupertino, CA (US); Cheng-Ho Yu, Cupertino, CA (US); Abbas Jamshidi Roudbari, Sunnyvale, CA (US); Ting-Kuo Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 13/584,549

(22) Filed: Aug. 13, 2012

(65) Prior Publication Data
US 2014/0043552 A1 Feb. 13, 2014

(51) Int. Cl.
*G02F 1/1345* (2006.01)
*G02F 1/1362* (2006.01)

(52) U.S. Cl.
CPC ...... *G02F 1/13454* (2013.01); *G02F 1/136286* (2013.01)
USPC .............................. 349/151; 349/149; 349/152

(58) Field of Classification Search
USPC ............................... 349/42, 43, 151, 152, 149
See application file for complete search history.

(56) References Cited

U.S. PATENT DOCUMENTS

| | | |
|---|---|---|
| 4,066,855 A | 1/1978 | Zenk |
| 4,085,302 A | 4/1978 | Zenk et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |

(Continued)

FOREIGN PATENT DOCUMENTS

| | | |
|---|---|---|
| JP | 2000163031 | 6/2000 |
| JP | 2002342033 | 11/2002 |

(Continued)

OTHER PUBLICATIONS

Martisauskas et al. U.S. Appl. No. 13/229,120, filed Sep. 9, 2011.

*Primary Examiner* — Richard Kim
*Assistant Examiner* — Kendrick Hsu
(74) *Attorney, Agent, or Firm* — Treyz Law Group; G. Victor Treyz; Kendall P. Woodruff

(57) ABSTRACT

A display may have a thin-film-transistor layer with a substrate layer. A layer of dielectric may be formed on the substrate layer and may have an upper surface and a lower surface. The thin-film-transistor layer may include an array of display pixels. Data lines and gate lines may provide signals to the display pixels. Gate driver circuitry in an inactive peripheral portion of the display may include a gate driver circuit for each gate line. The gate driver circuits may include thin-film transistors that are formed on the upper surface of the layer of dielectric. Signal lines such as a gate low line, a gate routing line coupled between the gate driver circuits, and a common electrode line may be formed from two or more layers of metal to reduce their widths or may be embedded within the dielectric layer between the upper and lower surfaces under the thin-film transistors.

16 Claims, 9 Drawing Sheets

(56) References Cited

U.S. PATENT DOCUMENTS

| | | |
|---|---|---|
| 7,663,607 B2 | 2/2010 | Hotelling et al. |
| 2006/0026521 A1 | 2/2006 | Hotelling et al. |
| 2006/0176072 A1* | 8/2006 | Kim et al. ............... 324/770 |
| 2006/0197753 A1 | 9/2006 | Hotelling |
| 2006/0215102 A1* | 9/2006 | Otose et al. ............... 349/151 |
| 2008/0259265 A1* | 10/2008 | Ono et al. ............... 349/147 |
| 2010/0157231 A1 | 6/2010 | Jung et al. |
| 2011/0122052 A1 | 5/2011 | Chen et al. |
| 2012/0090875 A1 | 4/2012 | Chae et al. |

FOREIGN PATENT DOCUMENTS

| | | |
|---|---|---|
| KR | 2007070398 | 7/2007 |
| KR | 2011067261 | 6/2011 |

\* cited by examiner

DISPLAY WITH MULTILAYER AND EMBEDDED SIGNAL LINES

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders.

It would therefore be desirable to be able to provide improved ways to provide displays for electronic devices.

SUMMARY

An electronic device may be provided with a display that has a layer of liquid crystal material interposed between a color filter layer and a thin-film-transistor layer. The display may have upper and lower polarizer layers. The thin-film transistor layer, liquid crystal layer, and color filter layer may be formed between the upper and lower polarizer layers.

The thin-film-transistor layer may have a substrate layer. A layer of dielectric may be formed on the substrate layer. The layer of dielectric may have an upper surface and a lower surface. The thin-film-transistor layer may include an array of display pixels. Data lines and gate lines may provide signals to the display pixels.

Gate driver circuitry in an inactive peripheral portion of the display may include a gate driver circuit for each gate line. The gate driver circuits may include thin-film transistors that are formed on the upper surface of the layer of dielectric. Signal lines such as a gate low line, gate routing paths coupled between the gate driver circuits, and a common electrode line may be formed from two or more layers of metal to reduce their widths while maintaining satisfactorily low resistances. If desired, signal conductors may be embedded within the dielectric layer between the upper and lower surfaces while running under the thin-film transistors to help reduce the size of the inactive peripheral portion of the display.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
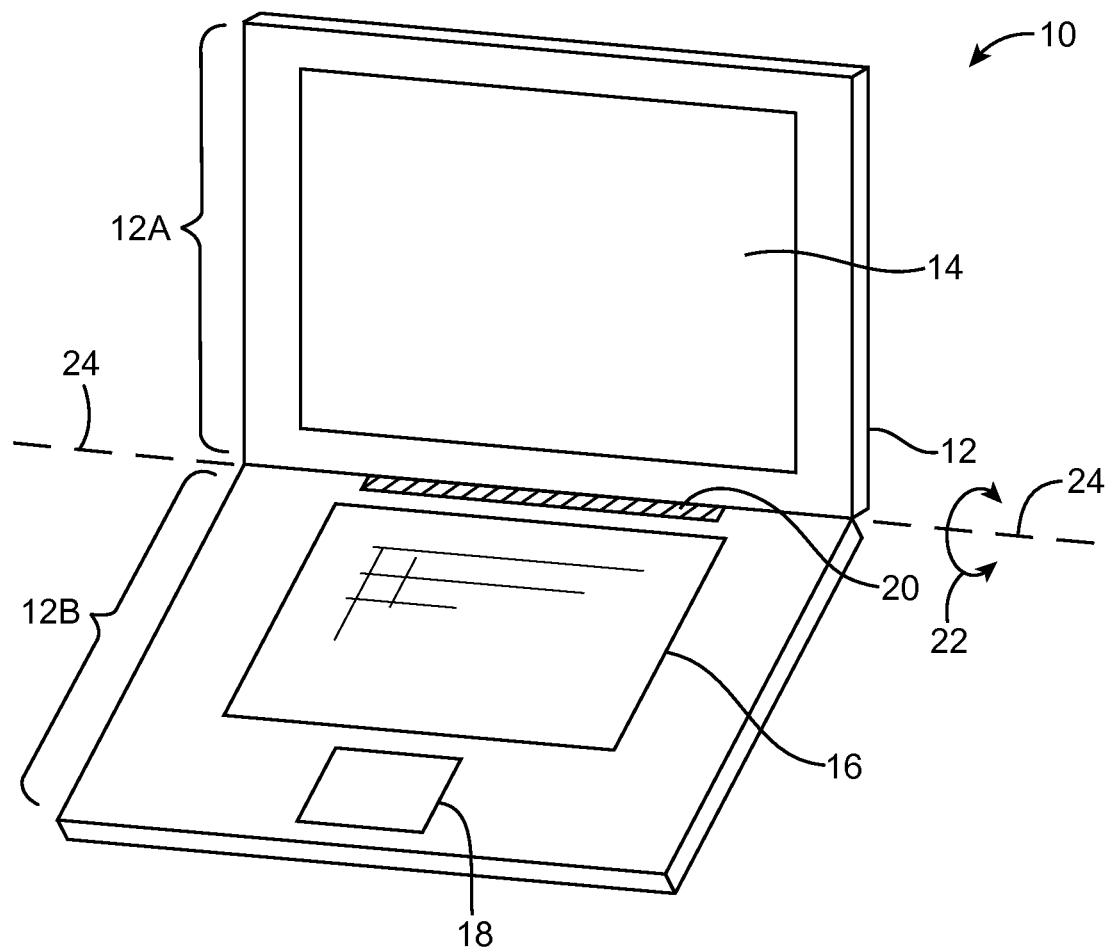
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
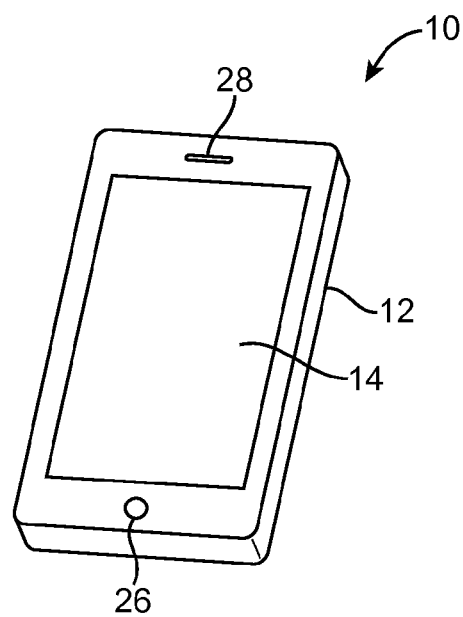
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
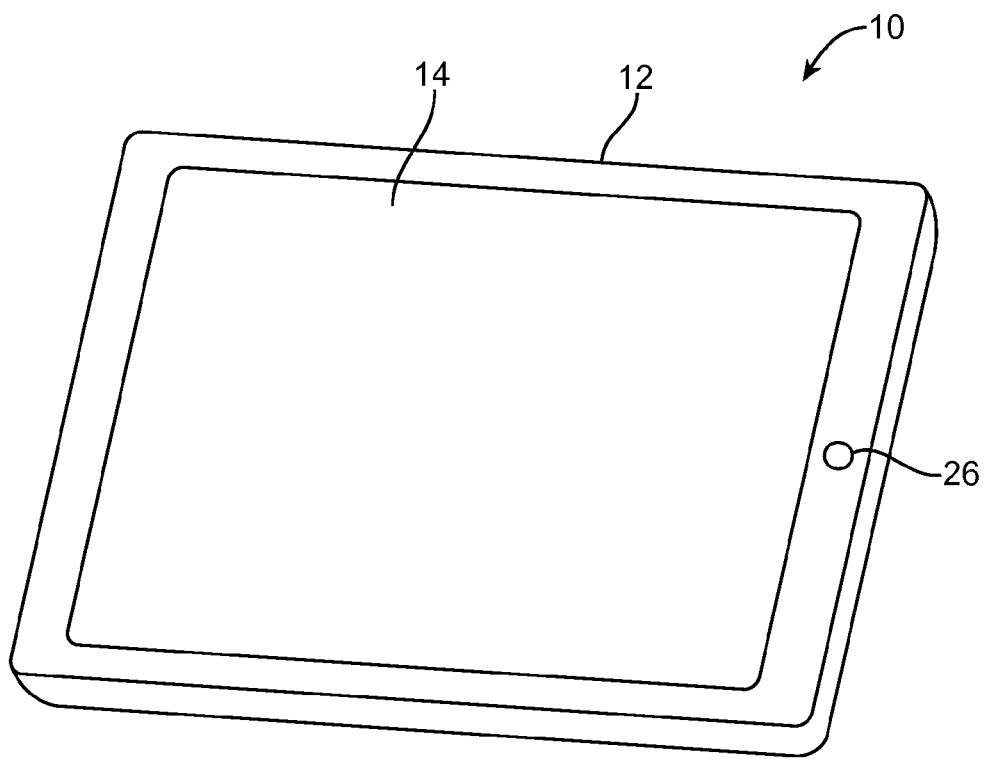
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer (e.g., a color filter layer or thin-film-transistor layer) with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer, thin-film transistor layer or other portion of a display may be used as the outermost (or nearly outermost) layer in display 14. For example, a color filter layer or thin-film transistor layer that is covered by a polarizer layer may form the outermost layer for device 10. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
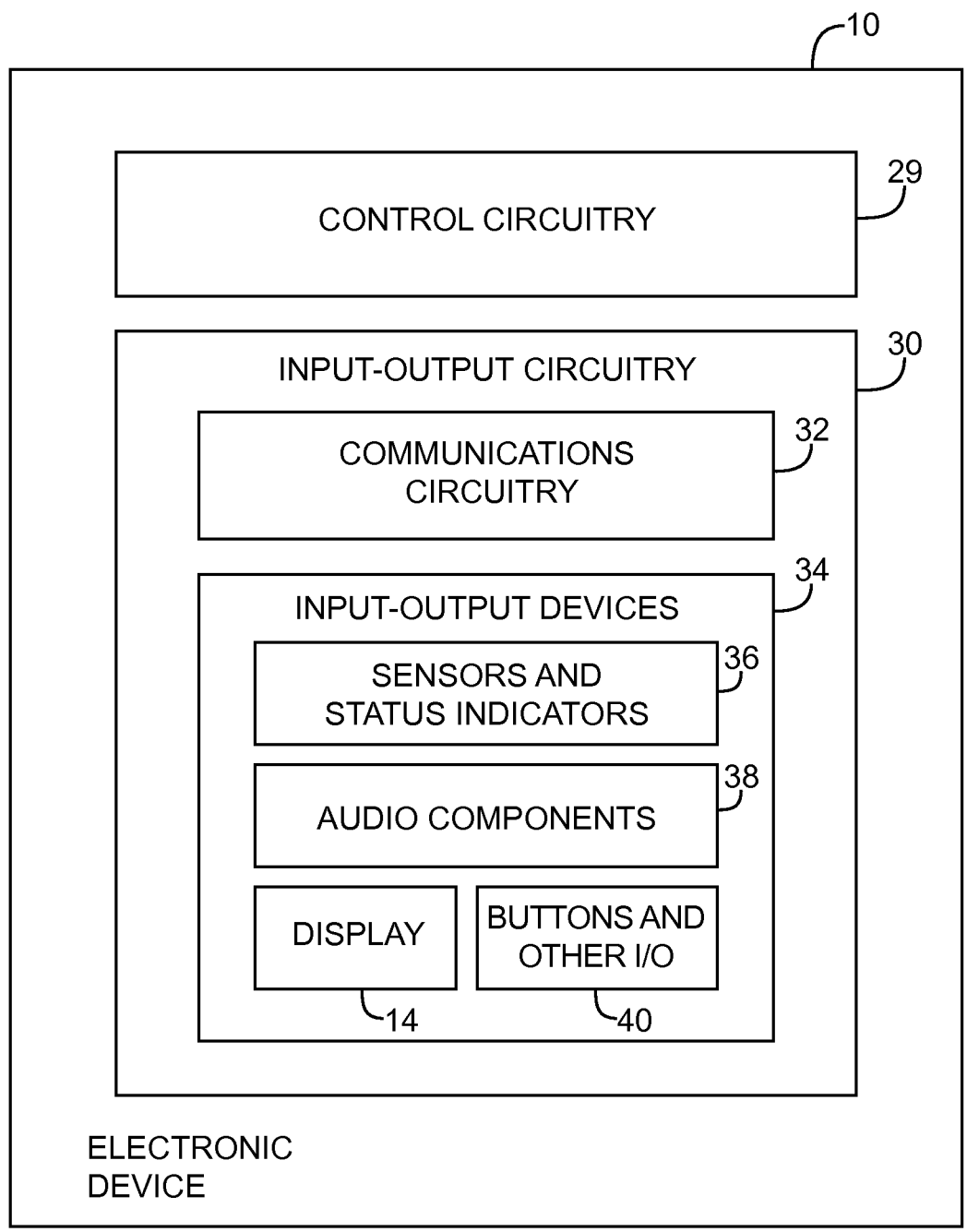
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
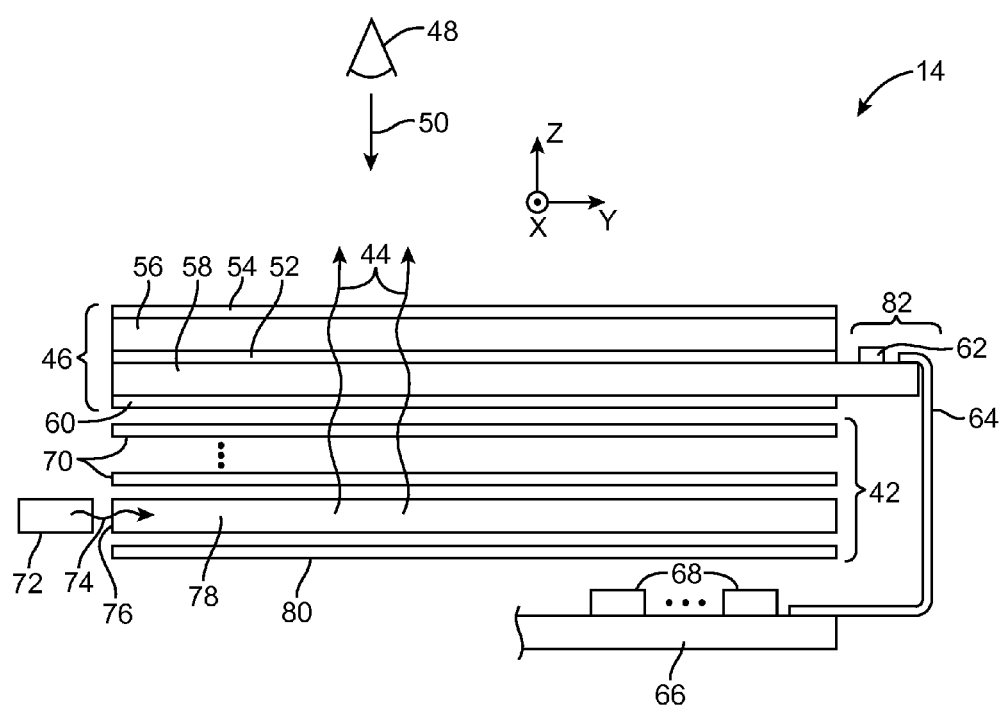
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52.

Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, the positions of color filter layer 56 and thin-film-transistor layer 58 may be inverted so that the thin-film-transistor layer is located above the color filter layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
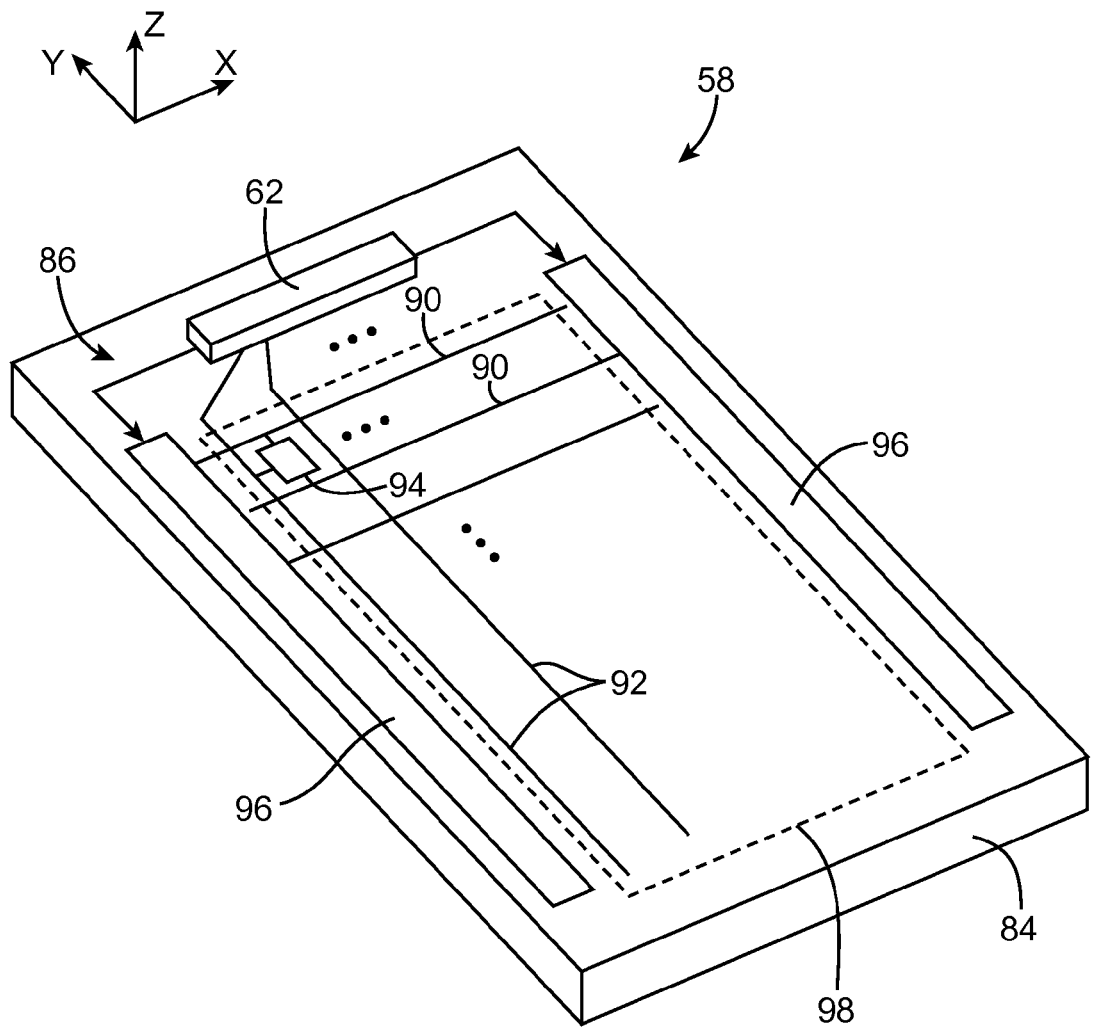
FIG. 6 is a perspective view of an illustrative thin-film transistor layer with gate driver circuitry and an array of display pixels in accordance with an embodiment of the present invention.

FIG. 6 is a perspective view of an illustrative thin-film transistor layer. As shown in FIG. 6, thin-film transistor layer 58 may include a substrate such as substrate 84 and components on the surface of substrate 84 such as components 86. Substrate 84 may be formed from a clear sheet of material such as a transparent glass or plastic layer (e.g., polyimide or other polymer, etc.). Components 86 may include one or more integrated circuits such as display driver integrated circuit 62. Components 86 may also include interconnect lines and thin-film circuitry such as amorphous or polysilicon thin-film transistor circuitry.

An array of display pixels 94 may be formed in a central rectangular region on substrate 84. Each display pixel 94 may include electrodes for applying an electric field to an associated portion of liquid crystal material 52. Common electrode 98 (sometimes referred to as a Vcom electrode) may be formed from a transparent conductive layer such as a layer of indium tin oxide and may be used in applying a common electrode signal to each display pixel. Each display pixel 94 may include a thin-film transistor for controlling the amount of electric field that is applied by the electrodes. The electric field may be proportional to the output of the thin-film transistor minus the Vcom signal (as an example). The central region of display 14 and thin-film-transistor layer that is associated with Vcom electrode 98 and the rectangular array of display pixels 94 in display 14 is sometimes referred to as the active area of display 14. A rectangular ring-shaped inactive border region (sometimes referred to as the inactive area or inactive border of display 14) may surround the periphery of the active area.

Patterned traces such as lines of metal may be used in routing control signals to display pixels 94. For example, data lines 92 may be used to route data signals to the pixels 94 from display driver integrated circuit 62 (directly or through associated thin-film transistor demultiplexer circuitry on substrate 84). Gate driver circuitry 96 may be arranged in columns on the sides of substrate 84 (i.e., in the inactive border region of the display). Gate control signals may be provided to the gates of the thin-film transistors in the display pixels 94 from gate driver circuitry 96 via gate lines 90. Gate lines 90 and data lines 92 may run perpendicular to each other to form a grid of crisscrossed metal lines on thin-film-transistor layer 58.

Figure 7:
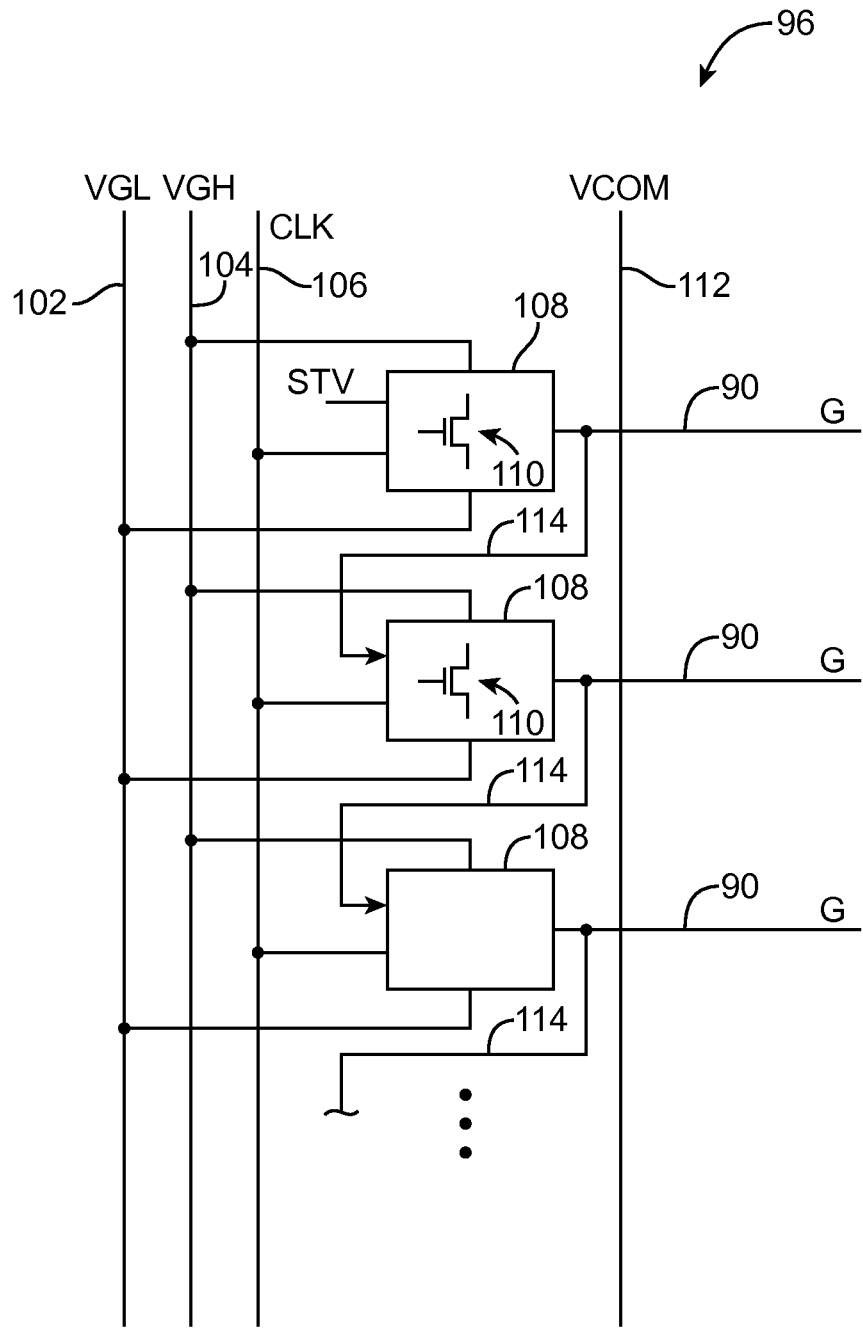
FIG. 7 is a circuit diagram of illustrative gate driver circuitry for a display in accordance with an embodiment of the present invention.

As shown in the circuit diagram of FIG. 7, gate driver circuitry 96 may include circuits such as gate driver circuits 108 that use thin-film transistors such as transistors 110. Each gate driver circuit 108 may generate a respective gate control signal G on a respective gate line 90.

The thin-film transistors on device 10 such as transistors 110 may be formed from polysilicon thin-film transistors and/or amorphous silicon thin-film transistors. Conductive lines such as lines 102, 104, 106, and 112 may be used to convey display signals for display 14. For example, lines such as VGL line 102 (sometimes referred to as a gate low line) may be used for supplying a gate low voltage, lines such as VGH line 104 may be used for supplying a gate high voltage, lines such as clock line 106 may be used for providing clock signals CLK, and lines such as line 112 may be used for distributing common voltage VCOM (e.g., to distribute common electrode signal VCOM to VCOM electrode 98 of FIG.

6). Lines such as lines VGH, CLK, and lines coupling adjacent gate drivers 108 may sometimes be referred to as routing lines. For example, the lines of gate driver circuitry 96 that are used for routing gate signals such as lines 114 may sometimes be referred to as gate routing lines.

Figure 8:
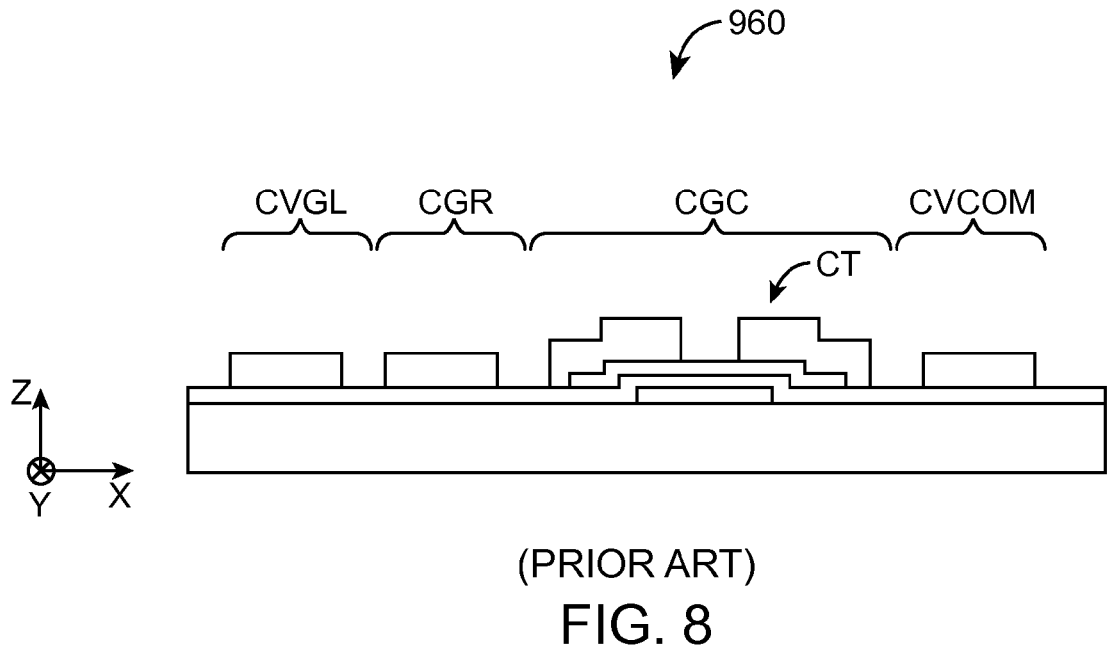
FIG. 8 is a cross-sectional side view of a conventional gate driver circuit.
Figure 9:
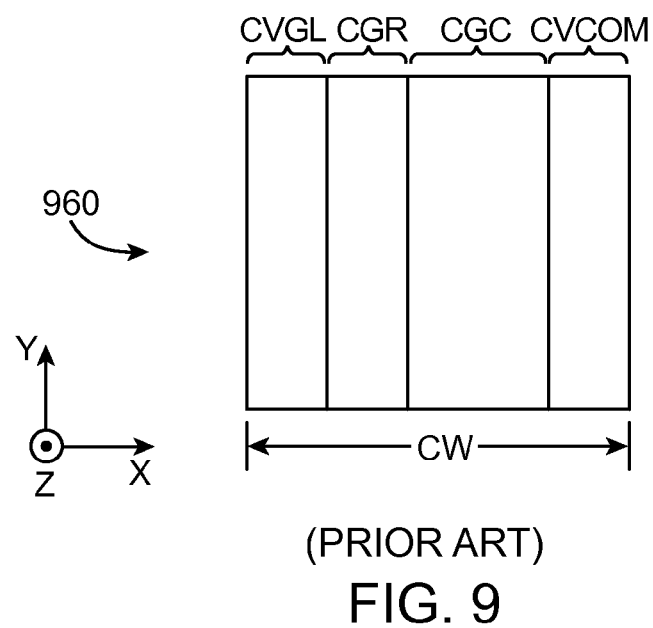
FIG. 9 is a top view of the conventional gate driver circuitry of FIG. 8.

The resistivity of the gate low lines, gate routing lines, and common voltage lines can affect display performance. If the resistance of a line is too large, it may not be possible to hold particular signals adequately at desired voltage levels. In conventional displays, low resistance is achieved using relatively wide lines. A cross-sectional side view of a gate driver circuit in a conventional display of this type is shown in FIG. 8. A shown in FIG. 8, conventional gate driver circuit 960 includes signal lines such as gate low line CVGL, gate routing line CGR, gate driver circuitry CGC (including thin-film transistors such as transistor CT), and common voltage line CVCOM. The metal lines of conventional circuits such as the circuit of FIG. 8 are generally formed from metals such as aluminum. To prevent stress cracks that might form when depositing a single thick layer of metal, lines such as lines SVGL, CGR, and CVCOM are conventionally restricted to no more than about 4000-5000 angstroms in thickness. To ensure adequately low resistance for these lines, the width of the lines is typically large (e.g., about 500 microns). Particularly in applications in which is desirable to minimize the total width of a display border, conventional gate circuits such as gate circuit 960 of FIG. 8 may give rise to unacceptably wide structures. As shown in the top view of circuitry 960 of FIG. 9, for example, gate circuitry 960 may be characterized by a width CW that is greater than desired.

Figure 10:
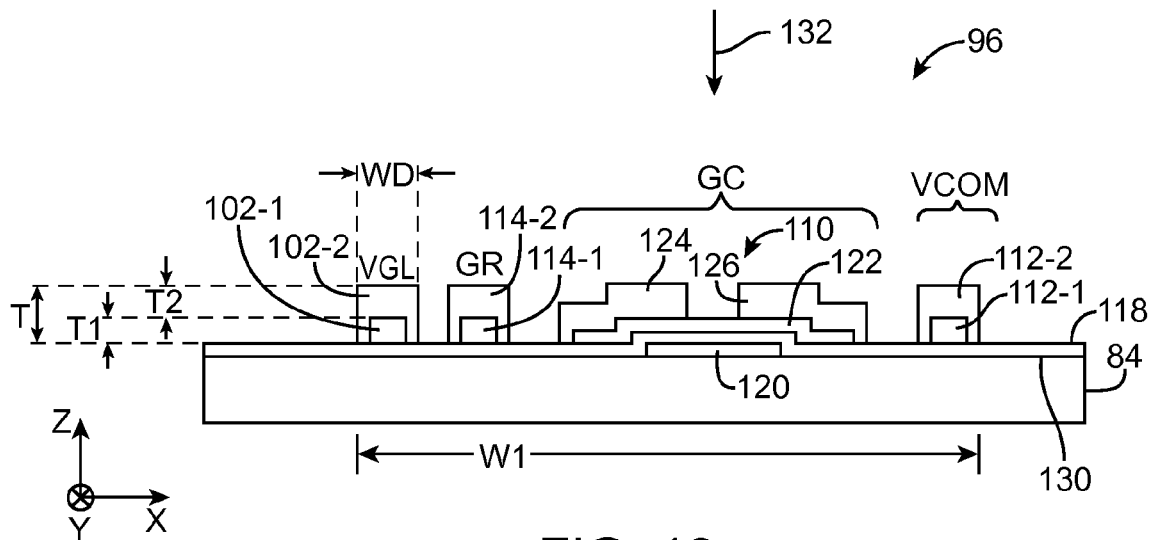
FIG. 10 is a cross-sectional side view of illustrative gate driver circuitry in accordance with the present invention.

A cross-sectional side view of gate driver circuitry 96 showing an illustrative configuration that may be used in reducing circuit width is shown in FIG. 10. As shown in FIG. 10, gate driver circuitry 96 may include structures that are formed on upper surface 130 of thin-film-transistor substrate 84. Gate driver circuitry GC may include thin-film transistors in circuits 108 such as transistor 110. Transistor 110 may include drain conductor 124, source conductor 126, thin-film semiconductor layer 122 (e.g., a layer of polysilicon or amorphous silicon), and gate conductor 120. Portions of a dielectric layer such as dielectric layer 118 may be used in forming a gate insulator between gate conductor 120 and silicon layer 122.

Dielectric layer 118 may be formed from an organic or inorganic material. As an example, dielectric layer 118 may be formed from silicon nitride or silicon oxide. The lower surface of dielectric layer 118 may lie on the upper surface of thin-film-transistor substrate 84. Thin-film-transistors such as transistor 110 may be formed on the upper surface of dielectric layer 118.

Gate driver circuitry 96 may have conductive lines such as gate low line VGL, gate routing line GR, and common electrode line VCOM. To minimize the width of these lines and thereby reduce the overall width W1 of gate circuitry 96, these lines may be fabricated using multiple layers of metal (e.g., two or more metal layers). As an example, during fabrication of gate driver circuitry 96, line VGL may be formed by depositing and patterning a lower line layer such a layer 102-1 followed by the deposition and patterning of an upper line layer such as layer 102-2. Gate routing lines such as line GR of FIG. 10 may be formed from a lower line portion 114-1 covered by an upper line portion 114-2. Common electrode line VCOM may likewise be formed by forming a patterned lower line layer such as line 112-1 and by forming a matching patterned upper line layer such as line 112-2.

In the example of FIG. 10, metal lines VGL, GR, and VCOM include two layers of patterned metal—a first layer that is formed on dielectric layer 118 and a second layer that is formed on top of the first layer. Additional layers may be deposited on the second layer if desired.

Metal layers may be deposited using physical vapor deposition, chemical vapor deposition, electrochemical deposition, or other techniques. Metal patterning operations may involve use of photolithography or other patterning techniques. Each deposited layer may have a thickness of about 4000-5000 angstroms (or 2000-7000 angstroms or other suitable thickness). As an example, thickness T1 of the first metal layers in lines VGL, GR, and VCOM may be characterized by a thickness T1 of about 4000-5000 angstroms and the thickness T2 of the second metal layers in lines VGL, GR, and VCOM may be characterized by a thickness T2 of about 4000-5000 angstroms. The total thickness T of lines VGL, GR, and VCOM may be about 8000 angstroms to 10,000 angstroms (1 micron) or may be other suitable thicknesses (e.g., 0.5 microns to 1.5 microns, etc.).

Because the thickness of lines VGL, GR, and VCOM is effectively doubled relative to conventional lines, the widths of these lines can be reduced without increasing line resistance. As an example, the width WD of lines VGL, GR, and VCOM can be reduced to about 250 microns while maintaining the same resistance as conventional lines CVGL, CGR, CGC, and CVCOM from the example of FIG. 8. If desired, the width WD of lines VGL, GR, and/or VCOM may have other values (e.g., more than 250 microns or less than 250 microns) and/or the thickness T of lines VGL, GR, and/or VCOM may have other values (e.g., more than 1 micron or less than 1 micron). The foregoing examples are merely illustrative.

Figure 11:
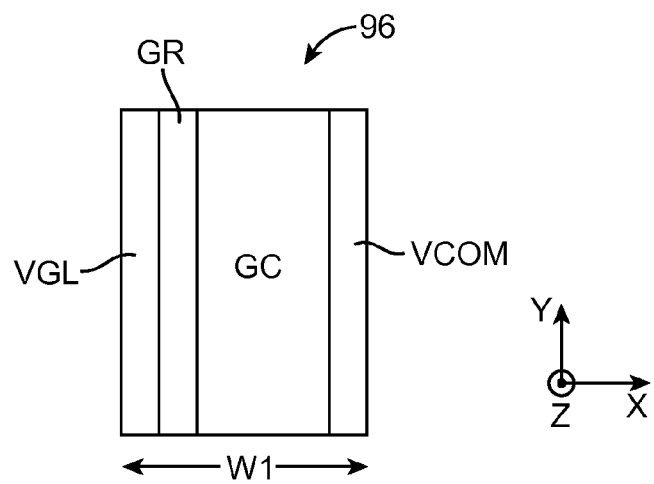
FIG. 11 is a top view of the illustrative gate driver circuitry of FIG. 10 in accordance with an embodiment of the present invention.

FIG. 11 is a top view of gate driver circuitry 96 of FIG. 10 viewed in direction 132. As shown in FIGS. 10 and 11, the total width W1 of gate circuitry 96 may be affected by the widths WD of lines VGL, GR, and VCOM (as well as the size of gate circuitry GC). By reducing the widths WD of lines VGL, GR, and VCOM through the use of multilayer metal structures, the total width W1 of gate circuitry 96 may be reduced (e.g., by 500 microns or more), thereby helping to minimize the inactive border region of display 14.

Figure 12:
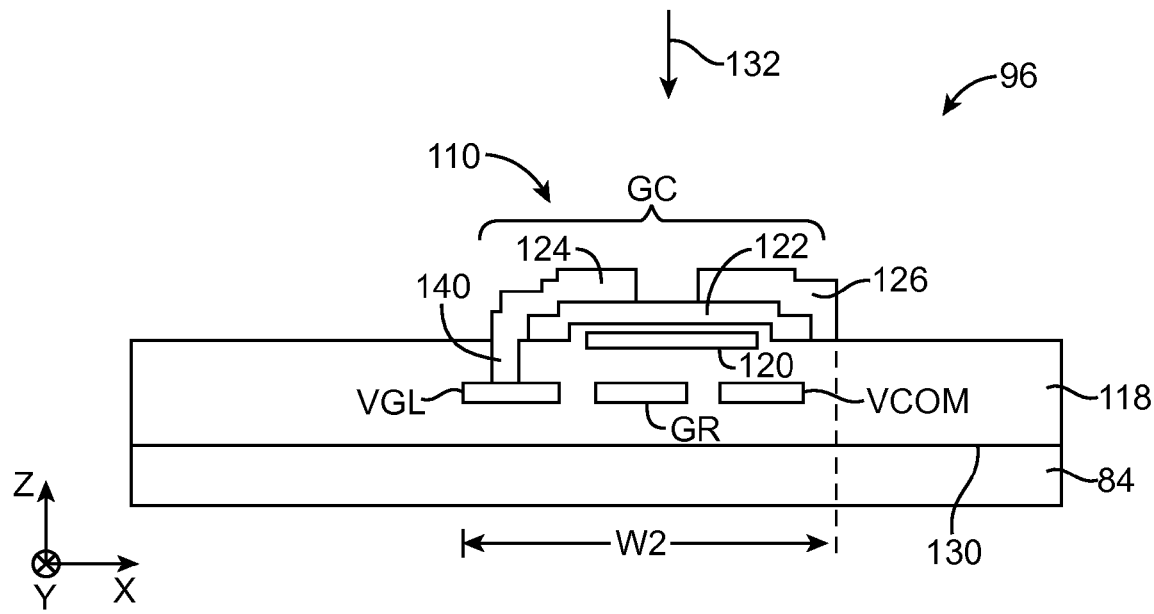
FIG. 12 is a cross-sectional side view of another illustrative gate driver circuit in accordance with an embodiment of the present invention.

If desired, some or all of the lines of gate circuitry 96 may be buried within dielectric layer 118. This type of configuration is shown in FIG. 12. With the arrangement of FIG. 12, gate circuitry 96 is formed on thin-film-transistor substrate layer 84.

As shown in FIG. 12, dielectric layer 118 may be formed on upper (outermost) surface 130 of thin-film-transistor substrate layer 84. Dielectric 118 may be formed from an organic material such as a polymer or an inorganic material such as silicon oxide or silicon nitride. Gate driver circuitry 96 may include gate circuitry GC that includes thin-film transistors such as thin-film-transistor 110. Thin film transistor 110 may include drain conductor 124, source conductors 126, and thin-film semiconductor layer 122 (e.g., a layer of polysilicon or a layer of amorphous silicon). Conductive lines such as gate low signal line VGL, gate routing lines such as gate routing line GR, and common electrode lines such as line VCOM may be formed within dielectric 118 while fully or partly running under gate circuitry GC such as thin-film transistors 110 and other circuitry associated with gate driver circuits 108 of FIG. 7. With this type of arrangement, gate circuitry GC may overlap some or all of lines VGL, GR, and/or VCOM (e.g., when viewed in direction 132 of FIG. 12).

Figure 13:
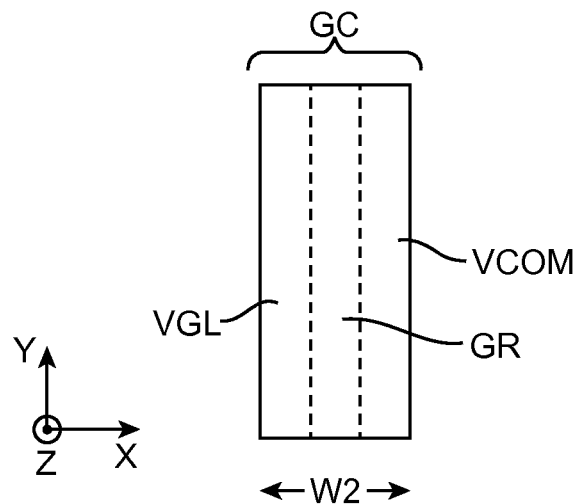
FIG. 13 is a top view of the illustrative gate driver circuitry of FIG. 12 in accordance with an embodiment of the present invention.

FIG. 13 is a top view of gate circuitry 96 of FIG. 12 when viewed in direction 132 of FIG. 12. As shown in FIG. 13, gate circuitry GC may overlap buried signal lines VGL, GR, and VCOM. These lines may run parallel to dimension Y. If desired, some of the lines in gate routing lines GR may run parallel to dimension Y and some of the lines in gate routing GR may run perpendicular to dimension Y (e.g., by briefly running parallel to dimension X). Gate circuitry GC may overlap all of gate low line VGL, part of gate low line VGL, all of gate routing lines GR, some of gate routing lines GR, all of line VCOM, and/or some of line VCOM. To minimize border width in display 14, it may, for example, be desirable for gate circuitry GC to completely overlap lines VGL, GR, and VCOM as shown in FIGS. 12 and 13. This type of arrangement may be used to eliminate the portion of width W1 of FIG. 10 that would otherwise be associated with forming lines VGL, GR, and VCOM on the surface of dielectric 118 adjacent to gate circuitry GC. Width W2 of FIGS. 12 and 13 may therefore be less than width W1, further reducing the size of the inactive border region of display 14.

Metal lines VGL, GR, and VCOM may be embedded within dielectric by depositing some of dielectric 118 followed by the deposition and patterning of the metal lines. The patterned metal lines may then be covered with additional dielectric 118 to form embedded structures of the type shown in FIG. 12.

Vias in the dielectric such as via structure 140 may be used to interconnect gate circuitry (e.g., drain conductor 124 of thin-film-transistor 110) to lines such as line VGL, GR, and VCOM). Via 140 may be formed by using wet or dry etching to create an opening in dielectric 118, followed by metal deposition and patterning.

Metal may be deposited for lines VGL, GR, and VCOM and for structures such as via 140, conductive drain 124, and conductive source 126 using physical vapor deposition, chemical vapor deposition, electrochemical deposition, or other metal deposition techniques.

Patterning operations may involve photolithography (as an example). If desired, fabrication techniques such as polishing techniques may be used to help planarize the structures of FIG. 12. Semiconductor fabrication techniques such as chemical vapor deposition may also be used in forming amorphous silicon or polysilicon structures such as transistor semiconductor layer 120.

The foregoing is merely illustrative of the principles of this invention and various modifications can be made by those skilled in the art without departing from the scope and spirit of the invention.

What is claimed is:

1. A display, comprising:
   upper and lower polarizers; and
   a thin-film transistor layer between the upper and lower polarizers, wherein the thin-film transistor layer includes a substrate layer, a rectangular array of display pixels controlled by signals on gate lines and data lines, and thin-film-transistor gate driver circuitry that supplies signals to the gate lines, wherein the gate driver circuitry includes thin-film transistors, wherein the thin-film transistor layer includes a dielectric layer on the substrate layer, and wherein the thin-film-transistor layer includes a common electrode voltage line that is embedded within the dielectric layer and that runs under the thin-film transistors.

2. The display defined in claim 1 wherein the dielectric includes a material selected from the group consisting of silicon oxide and silicon nitride.

3. The display defined in claim 2 wherein the substrate layer comprises glass and wherein the common electrode voltage line comprises metal.

4. The display defined in claim 1 wherein the thin-film-transistor layer further comprises a gate low metal line that is embedded within the dielectric layer and that runs under the thin-film transistors parallel to the common electrode voltage line.

5. The display defined in claim 4 wherein the thin-film transistor gate driver circuitry includes a plurality of gate driver circuits each of which provides a gate signal to a respective one of the gate lines, wherein the thin-film transistors are included in the gate driver circuits, and wherein the thin-film transistor gate driver circuitry includes at least one gate routing line that conveys signals between the gate driver circuits, that is embedded within the dielectric layer, and that runs under the thin-film transistors.

6. The display defined in claim 5 further comprising:
   a color filter layer interposed between the first and second polarizers; and
   a layer of liquid crystal material interposed between the color filter layer and the thin-film-transistor layer.

7. The display defined in claim 6 wherein the thin-film-transistor layer further comprises a gate low metal line that is embedded within the dielectric layer and wherein the gate low metal line runs under the thin-film transistors parallel to the common electrode voltage line.

8. The display defined in claim 1 wherein the common electrode voltage line distributes an electrical signal to a common electrode that controls the display pixels.

9. A display, comprising:
   upper and lower polarizers;
   a thin-film transistor layer between the upper and lower polarizers;
   a color filter layer between the upper and lower polarizers; and
   a layer of liquid crystal material between the thin-film transistor layer and the color filter layer, wherein the thin-film transistor layer includes a substrate layer, gate and data lines on the substrate layer, a rectangular array of display pixels on the substrate layer that are controlled by signals on the gate lines and data lines, and thin-film-transistor gate driver circuitry that supplies signals to the gate lines, wherein the gate driver circuitry includes thin-film transistors, wherein the thin-film transistor layer includes a dielectric layer on the substrate layer, wherein the dielectric layer has opposing upper and lower surfaces, wherein the lower surface of the dielectric layer lies on an upper surface of the substrate layer, and wherein the thin-film transistors are formed on the upper surface of the dielectric layer, and wherein the thin-film transistor layer comprises at least one metal line that is embedded within the dielectric layer between the upper and lower surfaces and that runs under the thin-film transistors on the upper surface.

10. The display defined in claim 9 wherein the at least one metal line includes a common electrode line, a gate low line, and a gate routing line.

11. The display defined in claim 10 wherein the gate routing line is interposed between the common electrode line and the gate low line.

12. The display defined in claim 9 wherein the at least one metal line comprises aluminum.

13. The display defined in claim 9 wherein the dielectric layer includes a material selected from the group consisting of silicon oxide and silicon nitride.

14. The display defined in claim 9 wherein the substrate layer comprises glass.

15. The display defined in claim 9 wherein the thin-film transistor gate driver circuitry includes a plurality of gate driver circuits each of which provides a gate signal to a respective one of the gate lines, wherein the thin-film transistors are included in the gate driver circuits, and wherein the at least one metal line includes a gate routing line that conveys signals between the gate driver circuits.

16. The display defined in claim 9 further comprising at least one conductive via in the dielectric layer that electrically couples the thin-film-transistor gate driver circuitry on the upper surface of the dielectric layer to the at least one metal line that is embedded within the dielectric layer.

* * * * *